United States Patent [19]

Chao et al.

[11] Patent Number: 5,340,500
[45] Date of Patent: Aug. 23, 1994

[54] CONDUCTING PAN-LAYERED INORGANIC COMPOSITE AND PREPARATION OF THE SAME

[75] Inventors: Kuei-Jung Chao; Shih-Yeng Ho, both of Hsinchu; Te-Chung Chang, Tao-Yuan, all of Taiwan

[73] Assignee: National Science Council, Taiwan

[21] Appl. No.: 23,097

[22] Filed: Feb. 26, 1993

[51] Int. Cl.$^5$ .................. H01B 1/00; B32B 9/00; B32B 15/04; C08G 73/06
[52] U.S. Cl. .................. 252/500; 252/518; 252/520; 428/688; 428/689; 524/783; 528/422
[58] Field of Search .......... 252/500, 518, 520; 428/688, 689; 524/706, 783, 711; 526/88; 528/422

[56] References Cited

U.S. PATENT DOCUMENTS

| | | | |
|---|---|---|---|
| 4,557,856 | 12/1985 | Miyakawa et al. | 252/500 |
| 5,008,468 | 4/1991 | King et al. | 568/697 |
| 5,032,547 | 7/1991 | Giannelis et al. | 252/500 |
| 5,198,153 | 3/1993 | Angelopoulos et al. | 428/500 |

OTHER PUBLICATIONS

"Electrochemical Behavior at Montmorillonite and Polypyrrole–Montmorillonite Films on Platinum and Glassy Carbon Electrodes" by Castro–Acuna et al., J. Electroanal. Chem. 234, pp. 347–353, 1987.

*Primary Examiner*—Paul R. Michl
*Assistant Examiner*—Tae H. Yoon
*Attorney, Agent, or Firm*—Marshall & Melhorn

[57] ABSTRACT

The present invention relates to a PAN composite and the process for preparation of the same, wherein an inorganic macroanionic insulator is employed as the host and an oxidizing polymerization of aniline is followed under an appropriate condition. The treatment and the encapsulation of the monomer in the preparation of layered organic-inorganic composite are also disclosed.

11 Claims, 4 Drawing Sheets

CONDUCTING PAN-LAYERED INORGANIC COMPOSITE AND PREPARATION OF THE SAME

BACKGROUND OF THE INVENTION

Most polymeric materials are not conductive. Over the past fifteen years, some organic polymers have been developed as conducting materials and termed synthetic metals. In general, they contain an extendable $\pi$-electron resonance system, i.e. a conjugation through the polymer chain. Therefore, the relationship between the chemical structure and the conductivity in the repeating unit of the polymer is of significance.

Polyaniline (PAN), the first conducting polymer to be investigated, was obtained from a sulfuric acid solution via anodic oxidation of aniline by H. Letheby in 1862. However, it was polyacetylene that triggered the study of conducting polymers, which are now fully understood. In the past decade, conducting polymers have been used in many fields, such as batteries, displays, optics, the aeronautical industry, and defense industry. Nonetheless, the stability caused by the physical properties as well as certain processing problems have not been thoroughly solved.

Conductivity is mainly determined by the product of two factors: the number of the carriers, i.e. electrons or holes; and the mobility of the carriers. The conductivity of most conducting polymers is similar in range to that of inorganic semi-conductors which have very few carriers ($10^{16}$–$10^{18}$/cc) but high mobility ($10^2$–$10^5$ cm$^2$/volt-sec) due to their high crystallinity, good purity, and few defects. Most conducting polymers are amorphous or partially crystalline, with carriers number of about $10^{21}$–$10^{23}$/cc that are about $10^4$–$10^5$ times larger than that of the inorganic semi-conductors, and low mobilities in the range of $10^{-4}$–$10^{-5}$ cm/volt-sec [M.G. Kanatzidis, Chemical & Engineering News, 68(49), (1990) 36]. Therefore, improvement in mobility is an essential requirement for enhancing conductivity of the conducting polymers. A synthetic method for producing materials with high crystallinity, good alignment, and few defects has not been found so far. Methods for modifying the main chain alignment of conducting polymers include:

(1) Polymerizing in the liquid crystalline solution to obtain high orientation of the product;
(2) Realigning polymers in a magnetic field;
(3) Stretching polymer film or fiber;
(4) Blending with precursors which are processable and soluble, and followed by heat treatment; and
(5) Encapsulating organic monomers to the holes of the regular inorganic lattices and followed by polymerization.

Among the above methods, encapsulation is employed for versatile composite materials. The idea is to offer a regular reaction room for the polymer and force its main chain into better alignment, as opposed to the tangled polymers produced by conventional synthesis. A decrease in the number of defects in the polymers' main chains is obtained from such a restricted environment thereof.

For example, polypyrrole and polythiophene fibers are made respectively in the holes of commercialized Nucleopore and Anopore alumina filtration membranes [Z. Cai and C.R. Martin, J. Am. Chem. Soc., 111 (1989) 4138]. Electrochemical synthesis is also utilized in the production of whiskers of the above polymers [W. Cahalene and M. Mortimer, Synth. Met., 43 (1991) 3079]. Their conductivities fall in the range of 3,000–7,500 S/cm. FeOCl can be encapsulated by either pyrrole or aniline, and polymers formed in the layers. These resulted inclusion compounds both display 1 S/cm conductivity [M.G. Kanatzidis, et al., J. Am. Chem. Soc., 109 (1987) 3797; C.G. Wu, et al., Abs. of Papers of the Am. chem. Soc., 199 (1990) 354] at room temperature as well as the thermotropic metal behavior of PAN/FeOCl at 220° K. Some conducting polymers can be encapsulated into the layers of $V_2O_5$, allowing the composite to be processed into anisotropic film. By controling the polymer content, n-type conductors can be converted to p-type ones, in addition to displaying good weather-resistance [M.G. Kanatzidis, et al., J. Am. Chem. Soc., 111 (1989) 4139]. Zeolite is another host candidate for the inclusion compound [T. Bein and P. Enzel, Mol. Cryst. Liq. Cryst., 181 (1990) 315]. The hole size of zeolite is exactly the magnitude of one polymer main chain, thus making the polymer non-interactive with the others, as well as providing insulation properties. In the future, the individual conjugated polymers or oligomers produced by this method may possibly be used as molecular wires in molecular electronics.

PAN is generally made of at least 1,000 aniline monomers through electrochemical or chemical-oxidizing polymerization. There are four oxidation forms of PAN shown below:

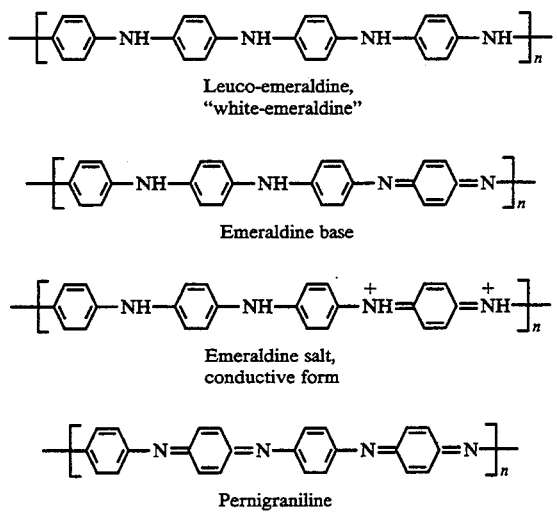

Leuco-emeraldine, "white-emeraldine"

Emeraldine base

Emeraldine salt, conductive form

Pernigraniline with conductivities of about $10^{-11}$ to 5 S/cm. PAN has different color and electricity depending upon their structures. Emeraldine salt (PAN-2S) is conductive [A.G. MacDiarmid, et al., in "Conducting Polymers Special Applications" (eds. L. Alcacer) D. Reidel Publishing Co. Holland, 1987, p. 105]. It becomes emeraldine base (PAN-2A) with no conductivity after base treatment. PAN-2A will be highly conductive without partial oxidation or reduction occured in the structure after simple protonation of the N-atoms on the main chain imine groups. The electron numbers of the polymer structure do not change after proton-blending. Therefore, the increased conductivity is related to the acidity of the solution. The effects of blending on the conductivity of PAN have been studied by several groups. Although the structure of PAN has not been fully determined so far, a linear model is generally recognized as follows:

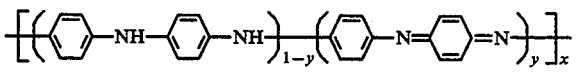

PAN is generally amorphous. But either PAN-2S or PAN-2A is considered as partially amorphous by Y. Cao, et al. [D. Vachon, et al., Synth. Met., 18 (1987) 297; S.D. Philips, et al., Phys. Rev. B. 39 (1989) 702 ].

Most conducting polymers are not dissolved in general organic solvents. This creates the problems with determining molecular weight. There are two number average molecular weight ($\overline{M}_n$) distributions for the insulating type PAN which is soluble in N-methylpyrrolidinone (NMP). The lower part of $\overline{M}_n$ distribution is at about 4,800 and the higher part is in the range of 200,000–350,000 [X. Tang, et al., Rapid Commun., 9 (1988) 829; A.G. MacDiarmid, et al., Polymer Eng. and Sci., 31 (1991) 147]. These $\overline{M}_n$ distributions result from a two-step polymerization. Pernigraniline is thus produced as an oxidated state of PAN by free radical/cation polymerization. The lower $\overline{M}_n$ part is produced by oxidation between pernigraniline and aniline. The conducting form of PAN, i.e. PAN-2S, dissolves in concentrated sulfuric acid (97%) but not in NMP solution, which has molecular weight of about 40,000 estimated by its viscosity [A. Andreatta, et al., Synth. Met., 41 (1991) 2305].

The properties of PAN are deeply affected by the conditions of polymerization, such as oxidant, ratio of oxidant and monomer, acidic medium, reaction temperature, and protonation level.

The following drawings provide a brief introduction to the inclusion chemistry which is a background of the present invention.

Inclusion compound is composed of a host and a guest (generally located in particular site of the hole). The host structure and the composition do not change in the encapsulating process, except for as slight deformation. There are two types of encapsulation described as follows.

(1) Mobile guests adsorb and intercalate to the host holes, i.e.,

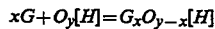

wherein G is the guest; H is the host; and O is a vacant lattice site.

(2) Guests intercalate to the host by ion-exchange, i.e.,

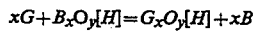

The requirements of host are described by R. Schollhorn in "Inclusion Compoundsm eds. J.L. Atwood; J.E.D. Davies an D.D. MacNicol, Academic Press, London, 1984" as the following:

(1) the host has thermal and dynamic stability at reaction temperature;
(2) the guest has polyhedral face of occupancy and delivery in the host lattice;
(3) the guest is of high mobility in the host holes.

Actually, these requirements are temperature-dependent. Most encapsulations occur at room temperature. Some others are very sensitive to the oxidant agent and have to proceed in an inert gas atmosphere. Additionally, a number of solavated inclusion compounds are stable only when there is an condition of excess amount of guest. A metastable inclusion compound can not be obtained by other synthetic methods.

The host lattice is structually divided into three types as described as follows.

(1) Framework host structures: a neighboring vacant lattice site in isolated or interconnected channels acts as a 3-dimensional shape-selective host.

(2) Layered structures: a neighboring vacant lattice site within Van der Waal's interlayered distance is planar aligned and acts as a 2-dimensional host with high flexibility to adsorb and exchange guest which may result in a deeply piled inclusion compound after intercalation is finished. The interlayered distance can be stably expanded to 50Å. But gel effect or lattice deformation will happen after multiple layered intercalation.

(3) Chain structures: these posses the same characteristics as layered structures, they are highly receptive to guest adsorption but easily affected by lattice defects and irregularity.

A few molecule solids with zero-dimensional structure and low crystal energy are utilized to carry out encapsulation only under appropriate conditions.

Figure 1C:
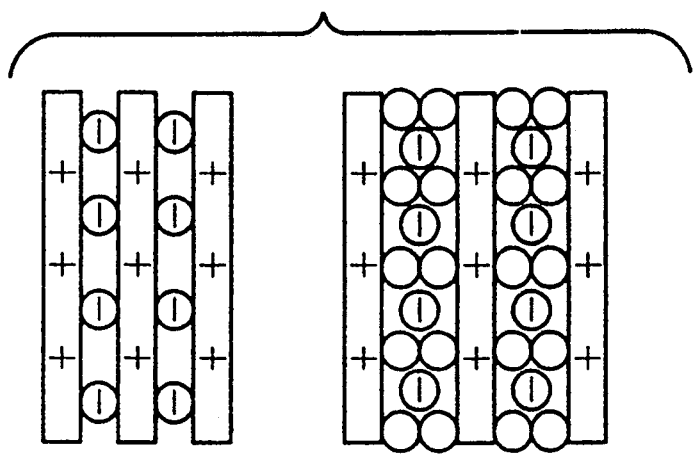
FIG. 1 shows the types of inclusion compounds. I=neutral host, II=macroanionic host (unsolavated and solavated), III=macrocationic host (unsolavated and solavated).
Figure 1B:
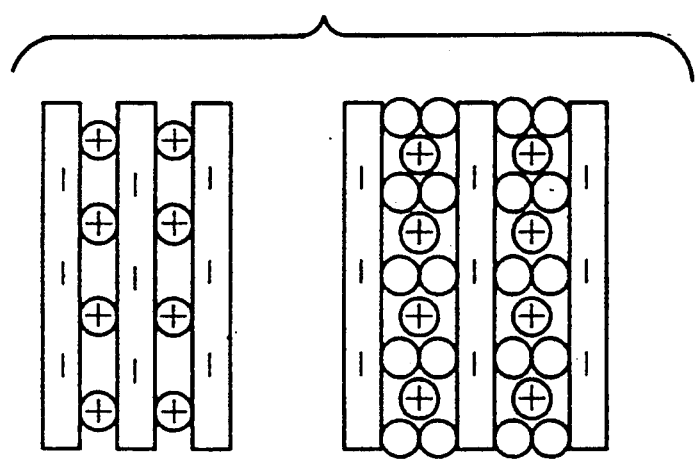
Figure 1A:
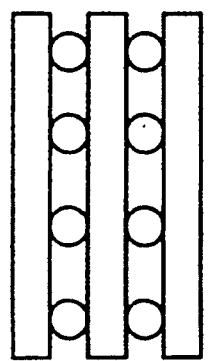

There are three types of inclusion compound as shown in FIG. 1, i.e., neutral, macroanionic, and macrocationic host lattice. The properties of inclusion compound are different due to the electrical charge of the host lattice thereof. Electrons in the insulator host are strongly localized, and have a constant charge density without the influence of guest migrations. Conversely, the conductive host varies its properties and electronic structure after intercalation.

After intercalation, the composite material composed of host and guest will gain the advantages of both of them and thus gain a specific conductivity. Conducting composite materials have gradually been reported over the past decade, for example: an organic-inorganic composite formed from mica host [U.S. Pat. No. 5,032,547 and V. Mehrotra, et al., Solid State Commun., 77 (1991) 155], a PAN involed organic-inorganic composite [J.M. et al., J. Chem. Soc., Chem. Commun., 21 (1991) 1529], and an electrochemically synthesized organic-inorganic composite [C.M. Castroacuna, et al., J. Electroanal. Chem. & Interf. Electrochem., 234 (1987) 347; H. Inoue, et al., J. Electranal. Chem., 233 (1987) 291]. The general disadvantages of them include small ion-exchange capacity and problems with mass production.

SUMMARY OF THE INVENTION

Accordingly, the present invention discloses the employment of an inorganic insulator host (Montmorillonite and metal oxide of group IV) with characteristic anionic framework structure, the intercalation of an organic monomer (aniline) via adsorption or ion-exchange, and the polymerization of the intercalated monomers. An improved PAN crystal type, decreased defects, and enhanced conductivity of a molecular composite will thus be the result. Conventional instrumental analyses of materials are also used to study the effect of the host lattice on PAN structure.

DETAILED DESCRIPTION OF THE INVENTION

Insulator host lattice is mainly provided by the multinary oxides of main group metals or transitional metals. Its electrical charge does not change with the guest migrations. Zeolites, sheet silicates, alkali oxometallates, β-alumina, and pyrochlores, all of them have excess localized negative charges but keep a balanced neutral in the structure.

Many insulators with layered structure are classified as silicates and non-silicates. Silicates can be further classified based on their chemical structures. Non-silicates contain mainly oxides and hydrous oxides.

A lot of layered silicates exist in the nature, which can be classified into five types:

a) double-layered (1:1): kaolenite group;
b) triple-layered (2:1): smectite group;
c) quadruple-layered (2:2): chlorite group;
d) between triple- and quadruple-layered; and
e) mixed accumulating layered minerals.

The fundamental structures of the above clays are similar. The differences are layer piling and substituted ions on the places of octahedral aluminum and tetrahedral silicon. There are three layers in the host unit of smectite, i.e. the outer layer, composed of two Si/O tetrahedral layers, and a layer of M(Al, Mg)/O, OH octahedral in between. These layers are negatively charged themselves and accompanied by equal charges of exchangeable cations inside.

Hydrous oxides uranylphosphates uranylarsenates uranylvanadates, vanadates, zirconium phosphates (ZrP), chromium zinc hydroxide, and their derivatives are layered compounds. Their structure and chemical properties are similar to those of mica type clays. Zirconium phosphates are known cation-exchanger with a rapid conclusion of intercalation if it occurs.

Figure 2:
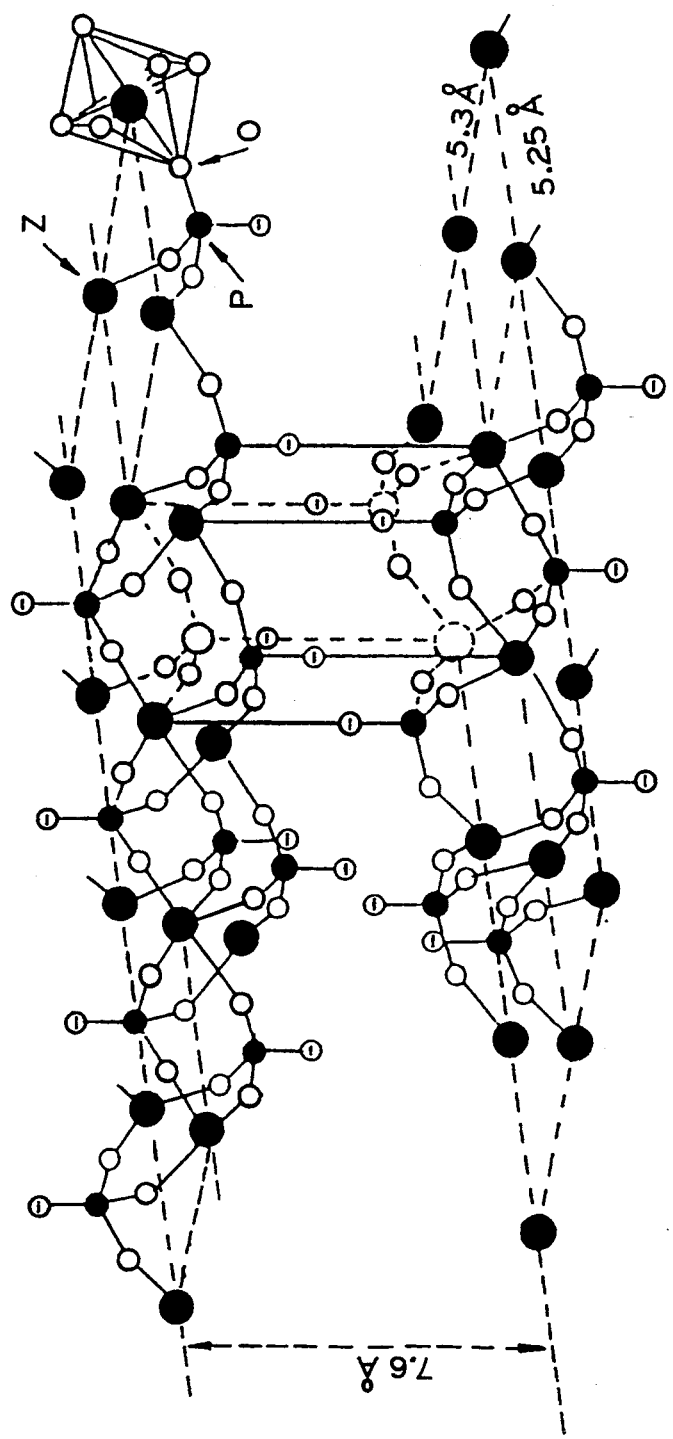
FIG. 2 shows the layered structure of α-zirconium phosphate (α-ZrP; abbreviated HZ).

The single crystal structure (FIG. 2) and the ion-exchange behavior of α-ZrP were published by A. Clearfield and J.A. Stynes in 1964. Other phosphates or arsenates of group IV metals were synthesized later. They can be presented as a general formula of

$M(IV)$ $(HXO_4)_2 \cdot nH_2O$ [$M = Ti, Zr, Sn, Ge; X = P, As$].

Lattice type varies according to the synthetic conditions.

Figure 3:
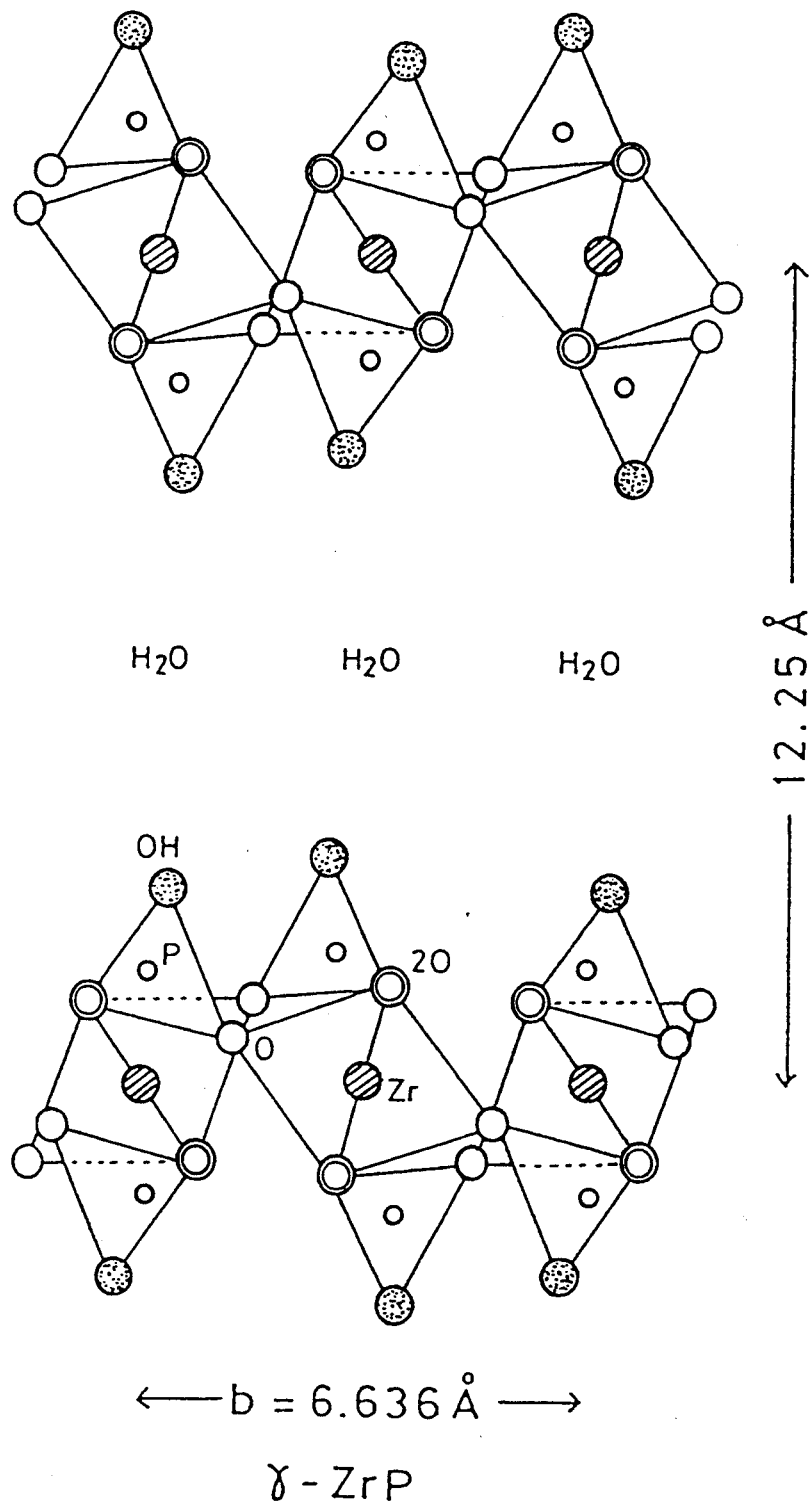
FIG. 3 shows the layered structure of τ-zirconium phosphate (τ-ZrP; abbreviated HP).
Figure 4A:
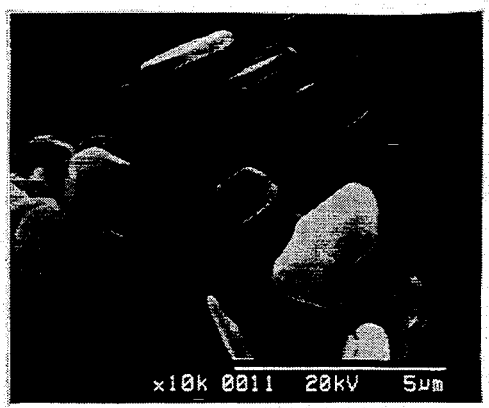
FIG. 4 shows SEM pictures of (a) HZ, (b) intercalated PAN-HZ, (c) isolated PAN ($\sim 1.5\mu m \times 1.5\mu m$) from HF-dissolved PAN-HZ, (d) and (e) isolated PAN sheet (width$\sim 100\mu m$).
Figure 4B:
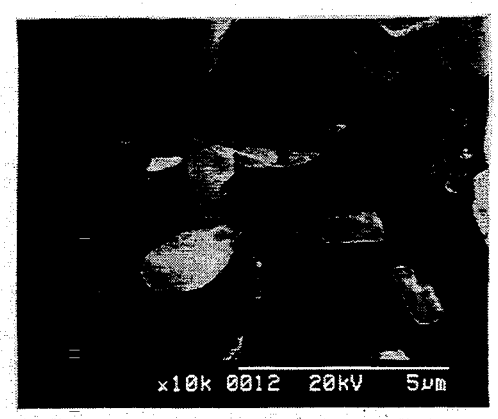
Figure 4C:
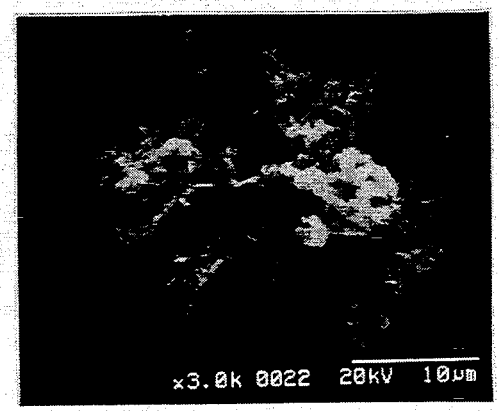
Figure 4D:
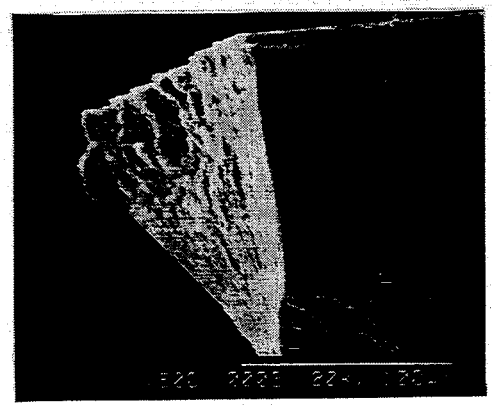
Figure 4E:
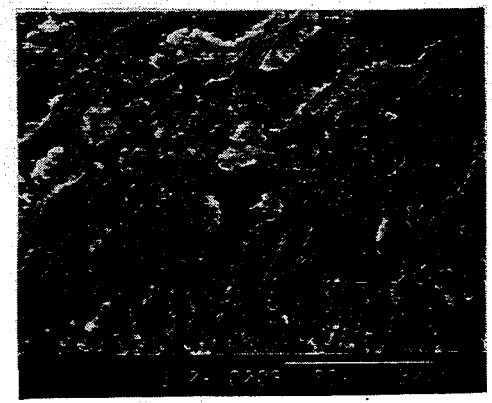

The unit dimensions of α-ZrP [$Zr(HPO_4)_2 \cdot H_2O$] layered compound are $a_h = 5.24$ Å, $c_h = 22.6$ Å, internal spacing (d) $= 7.5$ Å, Van der Waal's bonding interlayered, and distance between Bransted acidic centers (i.e., sites of exchanged cations) of 5.2 Å. Several types of the ion-exchange product of α-ZrP and $Na^+$ are dependant on ion-exchange capacity and water content. τ-ZrP [$Zr(HPO_4)_2 \cdot 2H_2O$] was first discovered by Clearfield in 1968. It is not merely a more highly hydrated α-ZrP, but a new phase. The ribbon-like τ-ZrP has the following unit dimensions: $a = 5.376$Å, $b = 6.636$Å, $c = 24.56$Å, $\beta = 93.94°$, and $d = 12.25$Å (FIG. 3). α-Zirconium arsenate (α-ZrAs) is structually similar to α-ZrP and has a corresponding ion-exchange ability. It has dimensions of: $a = 9.25$Å, $b = 5.34$Å, $c = 46.7$Å, $\beta 90.4°$.

In summary, ZrP has high ion-exchange capacity (5.14–7.76 meq/g) for monomer adsorption, good heat resistance, and τ-ray resistance; and possesses insulator macroanionic host, thus making it suitable for mass production via oxidant solution polymerization. The disadvantages of prior techniques will thus be overcome by use of the inventive materials disclosed in the present invention.

The composite preparation of this invention essentially comprises four steps described below.

(1) Synthesis of host:

i) α-ZrP [α-$Zr(HPO_4)_2 \cdot H_2O$, or HZ]:
A mixture of $HF/H_3PO_4$ (40%; 12ml /85%; 138ml) is added dropwise to a solution of $ZrOCl_2 \cdot 8H_2O/H_2O$ (16.5g/240ml), followed by refluxing for 105 hours under mechanical stirring. Then, the resultant mixture is centrifuged and washed with water to pH 5. The product is obtained after drying.

ii) Na-type host; Na-ZrP (or NaZ):
α-ZrP (2g) is dissolved in a sodium chloride aqueous solution (0.1M, 200ml). An sodium hydroxide aqueous solution (0.1M, 70ml) is added to the above solution dropwise. Following stirring overnight and centrifugation, the product is obtained after several water washings and drying.

iii) α-ZrAs [α-$Zr(HAsO_4)_2 \cdot H_2O$, or HS] and α-titanium phosphate [α-$Ti(HPO_4)_2 \cdot H_2O$, or HT] can be synthesized under the same conditions described for the preparation of α-ZrP.

iv) τ-ZrP [τ-$Zr(HPO_4)_2 \cdot 2H_2O$, or HP]:
A solution of $ZrOCl_2 \cdot 8H_2O$ (1M, 200ml) is added dropwise to a boiling solution of $NaH_2PO_4 \cdot 2H_2O$ (6M, 200ml). The gel-like mixture is added a concentrated HCl solution to adjust pH to about 2. Then the mixture is poured into a glass container and sealed in an autoclave. The reaction proceeds in an oven (190° C.) for a week. After cooling down to room temperature, $Na^+$ of the product is deionized by HCl (1M, 5l) washing. The ribbon-like τ-ZrP is then obtained after thorough water washing and drying.

(2) Intercalation of aniline i) α-ZrP (2g) is added to an aniline aqueous solution (5ml/200ml). After shaking (12 hr.), centrifugation, and drying at room temperature, the double-layer intercalated aniline-ZrP (AN-HZ) is produced.

ii) NaZ is used to react with $C_6H_5NH_3 + Cl^-$ solution of same concentration. Aniline ions can be double-layer encapsulated to the host, producing AN-NaZ.

iii) α-ZrP (2g) is dissolved in a sodium chloride aqueous solution (0.1M, 200ml), then a sodium hydroxie aqueous solution (0.1M, 34ml) is added dropwise. Stirring one day, centrifugation, and several water washings, the half-exchanged NaZ, i.e. NaHZ, is obtained after drying. ZrP-methanol complex is produced by reacting NaHZ with $HClO_4/CH_3OH$ solution (0.1M, 200ml) for one day. An aniline/methanol solution (0.1M, 200ml) is added to the centrifuged complex, stirring at room temperature for one day, the composite of double-layer intercalated AN-HZ' is obtained.

(3) Oxidizing polymerization i) Aniline intercalated α-ZrP is added to a solution of $FeCl_3 \cdot 6H_2O$ (molar ratio; aniline /$Fe^{+3} = 1 / 6$, addition of a small amount of $H_2O_2$ is allowed).

The product of green color is obtained after 6 hours reaction at room temperature.

ii) Aniline intercalated α-ZrP is suspended in deionized water (25ml), ice bathed, stirred for a couple minutes, then a solution of $(NH_4)_2S_2O_8$ (molar ratio; aniline /$(NH_4)_2S_2O_8$=4 / 1) is added dropwise. Under nitrogen gas and ice bath, reaction is allowed to proceed for one day. Green colored PAN-ZrP composite (PAN-HZ, PAN-HZ' or PAN-NaZ) is obtained after centrifugation, water washing, and drying.

In the case of preparing HS and HT, the same conditions of aniline adsorption and oxidizing polymerization as in α-ZrP system are employed.

(4) Washing treatment

Acid washing (HCl, 0.1M)—green colored product; Water washing—blue colored product.

Example 1

Comparison of αZrP-PAN Composite Under Different Treatments

Crystalline α-ZrP was put into an aqueous solution of aniline, followed by 9 hours shaking. Filtered and dried, the resultant product was added to a solution of $FeCl_3 \cdot 6H_2O$ (molar ratio; AN/$Fe^{+3}$=1/6, few drops of $H_2O_2$ are allowed). After an additional 12 hours of shaking, a green colored α-ZrP-PAN composite (i.e. PAN-$HZ_1$) was obtained. The product is of green color after acid washing but blue after washing in water. Both the electronic absorption spectra and conductivity data show that the conducting PAN and the insulator PAN are produced respectively after washing treatment, as shown in Table 1. The internal (or interlayer) spacing ($d_{001}$) of the product without washing shows that PAN is encapsulated in the ZrP layers, which decreases to that of α-ZrP after acid washing but totally deforms to amorphous after water treatment. IR spectra also show the characteristic absorptions (1570, 1481, and 1303 $cm^{-1}$) of PAN.

TABLE 1

| Sample | Oxidant | Acid or H$_2$O Wash | UV-Vis (nm) | XRD $d_{001}$(Å) | Conductivity σ (S/cm) |
|---|---|---|---|---|---|
| PAN—HZ$_1$ | Fe$^{+3}$ | | — | 14.5(7.9)$^a$ | — |
| | | Acid | 420;850$^b$ | 7.6 | 2.4 × 10$^{-1}$ |
| | | Water | 665$^c$ | Amorphous | 7.3 × 10$^{-4}$ |
| PAN—NaZ$_1$ | | Acid | 420;850 | 7.6 | 3.6 × 10$^{-2}$ |
| | | Water | — | Amorphous | 2.9 × 10$^{-3}$ |

$^a$Net internal spacing (interlayer-host frame distance)
$^b$Characteristic absorptions of salt-form PAN
$^c$Characteristic absorption of base-form PAN

Example 2

Product Comparison of Hydrogen Form and Sodium Form of α-ZrP

α-ZrP (2g) was dissolved in an aqueous NaCl solution (0.1M, 200ml), followed by the dropwise addition of aqueous NaOH solution (0.1M, 70ml). Stirring the mixture overnight, the product (i.e. green colored PAN-NaZ$_1$) was obtained after centrifuging, water-washings, and drying. Similar to the XRD data in the Example 1, the internal spacing of the product varies depending on acid or water washing. However, the conductivity data are different, as shown in Table 1. IR spectra also show characteristic PAN peaks.

Example 3

Product Comparison After Oxidation

Aniline containing α-ZrP was suspended in deionized water (25 ml). After stirring in an ice bath for a couple minutes a solution of $(NH_4)_2S_2O_8$ (molar ratio; AN/$(NH_4)_2S_2O_8$=4/1) was added dropwise. Allowed to react in a nitrogen and ice bath for one day, a green colored product (PAN-HZ$_2$ or PAN-NaZ$_2$) was obtained after centrifuging, water washing, and drying. The properties are shown in Table 2. SEM pictures of PAN-HZ$_2$ and isolated PAN are shown in FIGS. 4.

TABLE 2

| Sample | Oxidant | Acid or H$_2$O Wash | UV-Vis (nm) | XRD $d_{001}$(Å) | Conductivity σ (S/cm) |
|---|---|---|---|---|---|
| PAN—HZ$_2$ | [S]$^c$ | Water | — | 13.6(7.0)$^a$ | 1.2 × 10$^{-3}$ |
| | | HF$^b$ | 420;850 | — | 10$^{-1}$ |
| PAN—NaZ$_2$ | | Water | — | 13.6(7.0) | 2.5 × 10$^{-6}$ |

$^a$Net internal spacing
$^b$HF is used to break the inorganic layers and isolate PANs
$^c$[S] = $(NH_4)_2S_2O_8$

Example 4

Comparison of Products From Other Layered Hosts

The sythetic conditions of organic-inorganic composite from hosts of HS and HT were similar to that of Example 1. The properties of products PAN-HS$_1$ and PAN-HT$_1$ are shown in Table 3.

TABLE 3

| Sample | Oxidant | Acid or H$_2$O Wash | UV-Vis (nm) | XRD $d_{001}$(Å) | Conductivity σ (S/cm) |
|---|---|---|---|---|---|
| PAN—HS$_1$ | Fe$^{+3}$ | | | 14.3(7.7)$^a$ | — |
| | | Acid | 420;850 | 7.6 | 4.5 × 10$^{-2}$ |
| | | Water | 665 | 11.2(4.6) | 2.8 × 10$^{-3}$ |
| PAN—HT$_1$ | | | — | 7.6 | — |
| | | Acid | 420;850 | 7.6 | 10$^{-1}$ |
| | | Water | — | 7.6 | 2.9 × 10$^{-3}$ |

$^a$Net internal spacing

Example 5

Comparison of Some Other Products From Layered Hosts

The synthetic conditions of organic-inorganic composite from hosts of τ-ZrP (HP), HS, HT, and sodium form of α-ZrAs (NaS) were similar to that of Example 2. The properties of products PAN-HP$_2$, PAN-HS$_2$, PAN-HT$_2$, and PAN-NAS$_2$ are shown in Table 4.

TABLE 4

| Sample | Oxidant | Water Wash | XRD $d_{001}$(Å) | Conductivity σ (S/cm) |
|---|---|---|---|---|
| PAN—HP$_2$ | | | 15.8 | 3.3 × 10$^{-4}$ |
| PAN—HS$_2$ | | | 12.7(6.1)$^a$ | 8.7 × 10$^{-4}$ |
| PAN—HT$_2$ | $(NH_4)_2S_2O_8$ | Yes | 7.6 | 6.3 × 10$^{-4}$ |
| PAN—NaS$_2$ | | | 13(7.4) | 7.2 × 10$^{-6}$ |

$^a$Net internal spacing

Example 6

Comparison of Products from Montmorillonite Hosts

The hydrogen from (HM), sodium form (NaM), or cesium form (CsM) of montmorillonite had similar conditions of aniline-adsoption ( or ion-exchange ) and oxidizing-polymerization to that of the α-ZrP system while acting as a host. The XRD data are shown in Table 5.

TABLE 5

| Sample | Oxidant | Water Wash | XRD $d_{001}$(Å) |
|---|---|---|---|
| PAN—HM | | | 13.3(3.7)[a] |
| PAN—NaM | $(NH_4)_2S_2O_8$ | Yes | 13.2(3.6) |
| PAN—CsM | | | 13.1(3.5) |

[a] Net internal spacing

In summary of the above, PAN can be obtained by chemical synthesis in an acidic solution. The intercalation composite product has a relatively high conductivity of 0.24 S/cm (conductivity of bulk PAN of 5 S/cm is reported in literature), which is not conductive after base washing. The host in the present invention is itself acidic. This characteristic allows the polymerization to proceed without adding acid. Another characteristic is that the conductivity varies depending on the treating method of the host and the product. The XRD data show that the encapsulated aniline polymerized in the $\alpha$-ZrP layers by employing $Fe^{+3}$ solution as an oxidant. The conductivity of the product is $2.4 \times 10^{-1}$ S/cm after acid washing, but a decreased conductivity of $7.3 \times 10^{-4}$ S/cm after water washing. A similar result to that of the HZ system is obtained when HS is used as the host. However, the conductivity is comparable to that of the intercalated PAN asthe polymers exist only on the host surface when HT is used. It is not easy for $S_2O_8^{-2}$ to enter HT host layers and allow PANs do adsorb on the surface when $(NH_4)_2S_2O_8$ is used as the oxidant. Therefore, the organic-inorganic composite disclosed in this invention is available for mass production and a wide range of conductivity ($\sigma = 10^{-1} - 10^{-6}$ S/cm).

The above examples are disclosed as a superior embodiment for illustrating the present invention, but do not constitute a limitation to the claims.

What is claimed is:

1. A conducting PAN composite comprising an inorganic insulating layered compound with a general formula of $MA_2(XO_4)_2-nH_2O$ as a host and polyaniline obtained by polymerizing an intercaluted aniline monomer wherein M is Ti, Zr, Sn, or Ge;
A is H or Na;
X is P or As; and
n is 1 or 2.

2. A composite as defined in claim 1, wherein said host is a hydrogen form of $\alpha$-zirconium phosphate.

3. A composite as defined in claim 1, wherein said host is a half-exchanged sodium form a $\alpha$-zirconium phosphate.

4. A composite as defined in claim 1, wherein said host is a total-exchanged sodium form of $\alpha$-zirconium phosphate.

5. A composite as defined in claim 1, wherein said host is other cation form a $\alpha$-zirconium phosphate.

6. A composite as defined in claim 1, wherein said host is $\alpha$-zirconium arsenate.

7. A composite as defined in claim 1, wherein said host is $\alpha$-titanium phosphate.

8. A composite as defined in claim 1, wherein said host is $\tau$-zirconium phosphate.

9. A conducting PAN composite comprising an inorganic compound with a general formula of $MA_2(XO_4)_2-nH_2O$ as a host and polyaniline obtained by polymerizing an intercalated aniline, wherein M is Ti, Zr, Sn, or Ge;
A is H or Na;
X is or As; and
n is 1 or 2.

10. A composite as defined in claim 9 in which X is P.

11. A composite as defined in claim 9 in which the host is $\alpha$-Zr(HPO_4)_2-H_2O$.

* * * * *